United States Patent
Sagi et al.

(10) Patent No.: US 9,709,035 B2
(45) Date of Patent: Jul. 18, 2017

(54) SYSTEM AND METHOD FOR REGULATING POWER IN A WIND FARM

(71) Applicant: General Electric Company, Schenectady, NY (US)

(72) Inventors: Deepak Raj Sagi, Bangalore (IN); Pritesh Jain, Bangalore (IN); Kasi Viswanadha Raju Gadiraju, Bangalore (IN); Nithya Kalidass Anand, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 85 days.

(21) Appl. No.: 14/844,331

(22) Filed: Sep. 3, 2015

(65) Prior Publication Data
US 2016/0061188 A1   Mar. 3, 2016

(30) Foreign Application Priority Data
Sep. 3, 2014  (IN) ........................... 4288/CHE/2014

(51) Int. Cl.
*F03D 9/00* (2016.01)
*F03D 7/04* (2006.01)
*F03D 7/02* (2006.01)

(52) U.S. Cl.
CPC ........... *F03D 7/048* (2013.01); *F03D 7/0284* (2013.01); *Y02E 10/723* (2013.01)

(58) Field of Classification Search
CPC ....... F03D 7/048; F03D 7/0284; Y02E 10/723
See application file for complete search history.

(56) References Cited

U.S. PATENT DOCUMENTS

| 8,138,621 | B2 | 3/2012 | Stiesdal |
| 8,478,452 | B2 | 7/2013 | Pratt et al. |
| 2008/0093857 | A1 | 4/2008 | Stiesdal |

(Continued)

FOREIGN PATENT DOCUMENTS

| EP | 2139090 A1 | 12/2009 |
| JP | 2007009804 A | 1/2007 |

(Continued)

OTHER PUBLICATIONS

Yongqian., "Short-Term Wind-Power Prediction Based on Wavelet Transform-Support Vector Machine and Statistic-Characteristics Analysis".Industry Applications, IEEE Transactions on,Jul.-Aug. 2012,pp. 1136-1141, vol. 48, Issue: 4,ISSN:0093-9994.

*Primary Examiner* — Carlos Ortiz Rodriguez
(74) *Attorney, Agent, or Firm* — GE Global Patent Operation; Douglas D. Zhang

(57) ABSTRACT

A method is provided. The method includes identifying a dispatch interval for dispatching power from a wind farm, determining an observation time interval and a control time interval in the dispatch interval, computing a farm power moving average of the power of the wind farm, computing a grid frequency moving average of a grid frequency, determining a farm power set point based on a predefined wind farm operating model using the farm power moving average and the grid frequency moving average, controlling one or more wind turbines in the wind farm during the control time interval based on the farm power set point to regulate a farm-level dispatch power.

20 Claims, 8 Drawing Sheets

(56) References Cited

U.S. PATENT DOCUMENTS

| | | | | |
|---|---|---|---|---|
| 2008/0179887 A1* | 7/2008 | Kawazoe | ............... | F03D 7/028 290/44 |
| 2011/0309804 A1* | 12/2011 | Yasugi | ............... | F03D 7/0284 322/19 |
| 2012/0074698 A1* | 3/2012 | Hearns | ............... | F03B 13/12 290/43 |
| 2012/0101644 A1* | 4/2012 | Evans | ............... | G05B 13/026 700/287 |
| 2012/0104756 A1 | 5/2012 | Beekmann et al. | | |
| 2012/0313593 A1 | 12/2012 | Knueppel et al. | | |
| 2013/0140820 A1 | 6/2013 | Tarnowski | | |
| 2014/0070756 A1 | 3/2014 | Kearns et al. | | |

FOREIGN PATENT DOCUMENTS

| | | | |
|---|---|---|---|
| JP | 3950928 | A | 8/2007 |
| JP | 5100132 | B2 | 12/2012 |
| WO | 2004113720 | A2 | 12/2004 |
| WO | 2009156261 | A2 | 12/2009 |
| WO | 2010108910 | A2 | 9/2010 |
| WO | 2012088915 | A1 | 7/2012 |
| WO | 2013068233 | A2 | 5/2013 |
| WO | 2013068249 | A2 | 5/2013 |
| WO | 2013068256 | A1 | 5/2013 |
| WO | 2013068258 | A1 | 5/2013 |
| WO | 2013068264 | A1 | 5/2013 |
| WO | 2013068267 | A1 | 5/2013 |
| WO | 2013167142 | A1 | 11/2013 |

* cited by examiner

SYSTEM AND METHOD FOR REGULATING POWER IN A WIND FARM

BACKGROUND OF THE INVENTION

Embodiments of the present invention generally relate to wind farms and more particularly, relate to a system and method for dispatch scheduling and regulating power in wind farms.

Wind turbines are used to generate electrical power from wind energy. Multiple wind turbines may be coupled together to form a wind farm, and multiple wind farms may be coupled to a power grid. The wind farms are required to provide a committed power to the power grid for scheduling generation and maintaining load-generation balance. However, due to constant fluctuations in wind speed, a difference may occur between a power injected into the power grid and the committed power. In addition to constant fluctuations in wind speed, the load coupled to the power grid may also change constantly. Due to such fluctuations in wind speed and load, a grid frequency of the power grid varies constantly and the wind farms are required to control the power injected into the power grid to maintain grid frequency.

In one type of control methodology, the grid frequency is controlled based on instantaneous dispatch of power by wind farms and the wind farm owners are paid based on an instantaneous change in power supplied to the power grid. However, in some regions, the grid frequency is controlled based on an average frequency of the wind farm for a power dispatch interval. In such scenarios, the wind farm owners are paid based on a predetermined operating revenue model which encourages the wind farm owners to help maintain the grid frequency. The payment of the wind farm owner in such scenarios is computed based on the average frequency of the wind farm in the power dispatch interval unlike the instantaneous power dispatch model. Therefore, use of instantaneous power dispatch control methodology in controlling average frequency of the wind farm in a power dispatch interval leads to unnecessary and complex controls of the wind turbines and undesirable loss of revenue.

Hence, it would be desirable for wind farms to have further options for addressing frequency variations specific to controlling the average frequency of the wind farms in the power dispatch interval.

BRIEF DESCRIPTION OF THE INVENTION

Briefly, in accordance with one embodiment, a method for regulating power in a wind farm is provided. The method includes identifying a dispatch interval for dispatching power from a wind farm, determining an observation time interval and a control time interval in the dispatch interval, computing a farm power moving average of the power of the wind farm, computing a grid frequency moving average of a grid frequency, determining a farm power set point based on a predefined wind farm operating model using the farm power moving average and the grid frequency moving average, controlling one or more wind turbines in the wind farm during the control time interval based on the farm power set point to regulate a farm-level dispatch power.

In accordance with another embodiment, a wind farm is provided. The wind farm includes a plurality of wind turbines operatively coupled to each other, wherein each wind turbine comprises a wind turbine controller. The system also includes a wind farm controller communicatively coupled to the wind turbine controller of each wind turbine. The system further includes a dispatch controller operatively coupled to the wind farm controller. The dispatch controller is configured to identify a dispatch interval for dispatching power from a wind farm, determine an observation time interval and a control time interval in the dispatch interval, compute a farm power moving average of the power of the wind farm, compute a grid frequency moving average of a grid frequency, determine a farm power set point based on a predefined wind farm operating model using the farm power moving average and the grid frequency moving average, and communicate the farm power set point to the wind farm controller. Furthermore, the wind farm controller is configured to receive and convert the farm power set point to one or more turbine-level set points and communicate the one or more turbine-level set points to one or more wind turbine controllers. The one or more wind turbine controllers control respective wind turbines in the wind farm during the control time interval based on the turbine-level set points to regulate a farm-level dispatch power.

In accordance with yet another embodiment, a method for scheduling and dispatching power from a wind farm is provided. The method includes computing a first farm power forecast for a predefined forecast period. The method also includes computing a first grid frequency forecast for the predefined forecast period. The method further includes adjusting the first farm power forecast based on a predefined wind farm operating model and the first grid frequency forecast for the predefined forecast period. The method also includes identifying a dispatch interval from the predefined forecast period. The method further includes obtaining a first adjusted farm power for the dispatch interval from a first adjusted farm power forecast. The method also includes computing a farm power moving average of power of the wind farm. The method further includes computing a grid frequency moving average of a grid frequency. The method also includes determining a farm power set point based on the predefined wind farm operating model using the farm power moving average and the grid frequency moving average. The method further includes controlling one or more wind turbines in the wind farm during the control time interval based on the farm power set point to dispatch the first adjusted farm power in the dispatch interval.

DETAILED DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION THE INVENTION

Embodiments of the present invention include a system and method for scheduling and regulating power in a wind farm. The wind farm includes a plurality of wind turbines operatively coupled to each other, wherein each wind turbine comprises a wind turbine controller. The system also includes a wind farm controller communicatively coupled to the wind turbine controller of each wind turbine. The system further includes a dispatch controller operatively coupled to the wind farm controller. The dispatch controller is configured to identify a dispatch interval for dispatching power from a wind farm and to determine an observation time interval and a control time interval in the dispatch interval. The dispatch controller is further configured to compute a farm power moving average of the power of the wind farm in the observation time interval and to compute a grid frequency moving average of a grid frequency in the observation time interval. The dispatch controller is also configured to determine a farm power set point based on a predefined wind farm operating model using the farm power moving average and the grid frequency moving average during the observation time interval, and further to communicate the farm power set point to the wind farm controller. As used herein, the term "farm power set point" may be defined as a set point that may be communicated to the wind farm controller for enabling the wind farm to generate power based on the set point. Furthermore, the wind farm controller is configured to receive and convert the farm power set point to one or more turbine-level set points and communicate the one or more turbine-level set points to one or more wind turbine controllers. The one or more wind turbine controllers control respective wind turbines in the wind farm during the control time interval based on the one or more turbine-level set points to regulate a farm-level dispatch power. As used herein, the term "farm-level dispatch power" may be defined as power dispatched by the wind farm during the dispatch interval.

Figure 1:
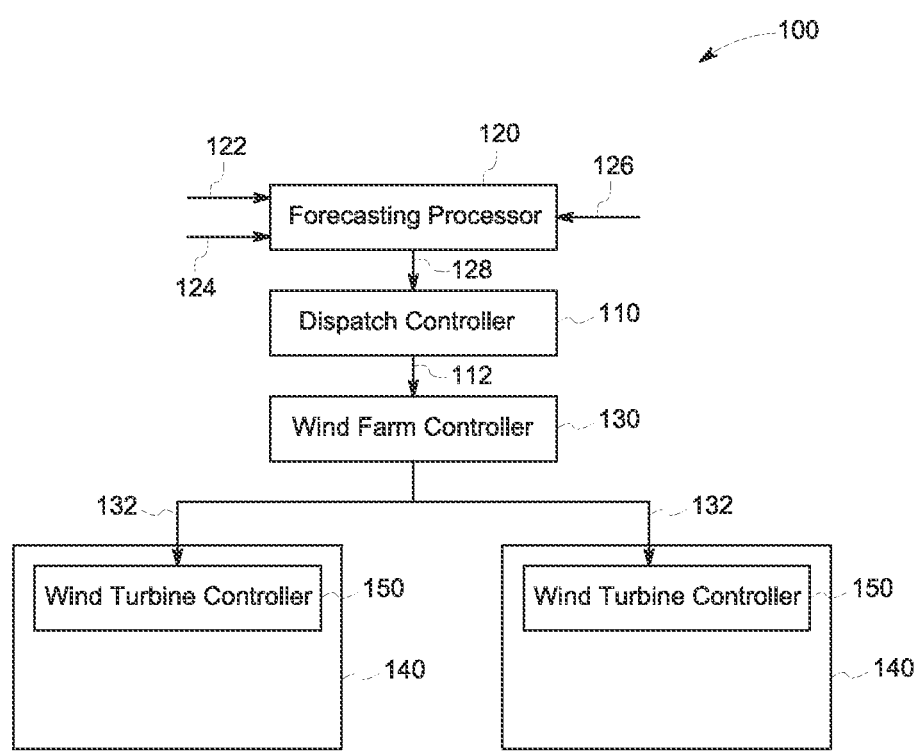
FIG. 1 is a block diagram representation of a wind farm including a dispatch controller in accordance with an embodiment of the invention.

FIG. 1 is a schematic representation of a wind farm 100 including a dispatch controller 110 in accordance with an embodiment of the invention. The dispatch controller 110 is configured to compute a farm power set point 112 for the wind farm 100 for generating power based on the farm power set point 112. In one embodiment, the dispatch controller 110 is communicatively coupled to a forecasting processor 120. The forecasting processor 120 is configured to obtain a grid frequency 122 from a power grid (not shown), an actual power generation estimate 124 of the wind farm and weather forecast information 126. In one embodiment, the weather forecast information 126 may include wind speed and wind direction. In another embodiment, the forecasting processor 120 may obtain the weather forecast information 126 from a meteorological station, a wind sensing device such as LIDAR, situated in the wind farm 100 or a combination thereof.

Furthermore, the forecasting processor 120 includes a historical data of the wind speed and farm power generated by the wind farm 100 during such wind speeds. The forecasting processor 120 also includes historical grid frequency data that depicts variations in grid frequency during various time intervals. The forecasting processor 120 uses the historical data of the wind speed, the historical data of the farm power, the actual power generation estimate 124 and the weather forecast information 126 to compute a first farm power forecast for a predefined forecast period. In one embodiment, the predefined forecast period includes a forecast period of at least sixty minutes ahead of the instantaneous time. Moreover, the forecasting processor 120 uses the historical grid frequency data, the grid frequency 122 obtained from the power grid, and the first farm power forecast to determine a first grid frequency forecast for the predefined forecast period. Furthermore, the forecasting processor 120 adjusts the first farm power forecast based on the first grid frequency forecast, and utilizes a predefined wind farm operating model (not shown) to determine a first adjusted farm power forecast 128. Further details of adjusting the first farm power forecast are described later in the specification, The forecasting processor 120 communicates the first adjusted farm power forecast 128 to the dispatch controller 110 in the wind farm 100.

The dispatch controller 110 is configured to receive the first adjusted farm power forecast 128 and identify a dispatch interval for dispatching power from the wind farm 100 based on the first adjusted farm power forecast 128 for the dispatch interval. In one embodiment, the dispatch interval includes a fifteen minute dispatch interval.

Figure 2:
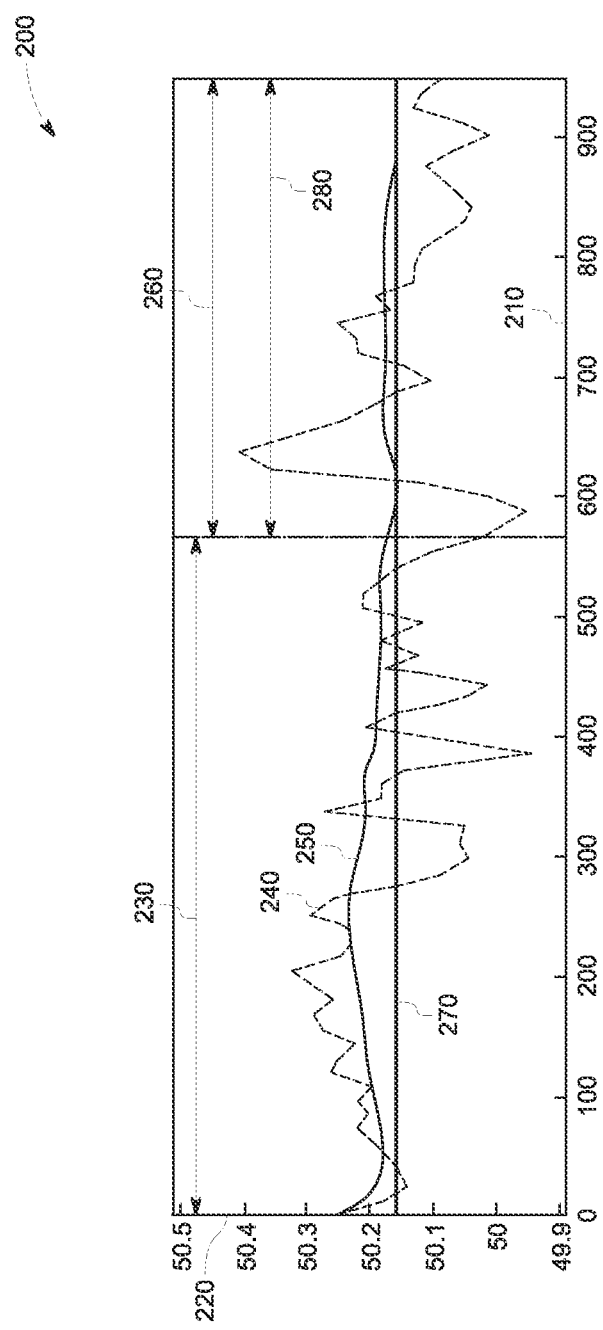
FIG. 2 is an exemplary graphical representation of the dispatch interval identified by the dispatch controller (FIG. 1) depicting identification of different time intervals in the dispatch interval for one time instant in the dispatch interval in accordance with an embodiment of the invention.

FIG. 2 is an exemplary graphical representation of the dispatch interval 200 identified by the dispatch controller (FIG. 1) depicting identification of different time intervals in the dispatch interval 200 for one time instant in the dispatch interval 200 in accordance with an embodiment of the invention. X-axis 210 represents time of the dispatch interval 200 in seconds wherein a fifteen minute dispatch interval includes nine hundred (900) seconds as represented on X-axis. Y-axis 220 represents frequency in Hertz. Upon initiation of the dispatch interval 200, the dispatch controller determines an observation time interval 230 in the dispatch interval 200, where the dispatch controller obtains an instantaneous grid frequency from the power grid represented by curve 240 and computes a grid frequency moving average of the power grid represented by curve 250. Similarly, the dispatch controller obtains an instantaneous dispatch of power from the wind farm and computes a farm power moving average of the power of the wind farm (FIG. 1). As used herein, the term "farm power moving average" may be defined as a moving average of the power generated by the wind farm within the dispatch interval. Similarly, the term "grid frequency moving average" may be defined as a moving average of the grid frequency during the dispatch interval.

During the observation time interval 230, the dispatch controller observes the grid frequency moving average 250 and the farm power moving average without performing any control to regulate the power of the wind farm. Furthermore, the dispatch controller includes predefined conditions based on which the dispatch controller determines if a control time interval 260 needs to be initiated. In one embodiment, the observation time interval 230 and the control time interval 260 form the dispatch time interval. In an exemplary embodiment, the predefined conditions may include a grid frequency threshold range of the grid frequency moving average and a farm power threshold range of the farm power moving average. In another embodiment, the predefined conditions may include a deviation of the grid frequency moving average from a predetermined internal grid frequency average represented by curve 270 or the farm power moving average from a predetermined internal farm power average (not shown), as a function of time remaining in the dispatch interval 200 after the observation time interval 230.

In one embodiment, the dispatch controller identifies a prediction time interval represented by section 280 in the dispatch interval 200 after initiating the observation time interval 230. The dispatch controller computes a second farm power forecast and a second grid frequency forecast for the prediction time interval 280 to determine if the predefined conditions are met for the dispatch interval 200. In situations, where the predefined conditions are not met, the dispatch controller computes a time period within the dispatch interval 200 which may be required to meet the predefined conditions of the wind farm. Such time period in the dispatch interval 200 is designated as the control time interval 260. Upon arrival of such time instant in the dispatch interval 200, where the aforementioned time period coincides with the end of the dispatch interval 200, the dispatch controller initiates the control time interval 260. In a specific embodiment, the prediction time interval 280 is less than the dispatch interval 200 and is therefore, less than the predefined forecast period of the first grid frequency forecast and the first farm power forecast. In another embodiment, the prediction time interval 280 is initiated after the observation time interval 230, however, the prediction time interval 280 and the control time interval 260 may overlap in certain situations as shown. The aforementioned steps are repeated continuously during the dispatch interval 200 for different time instants and durations of the observation time interval, the prediction time interval and the control time interval may change in each time instant.

Figure 3:
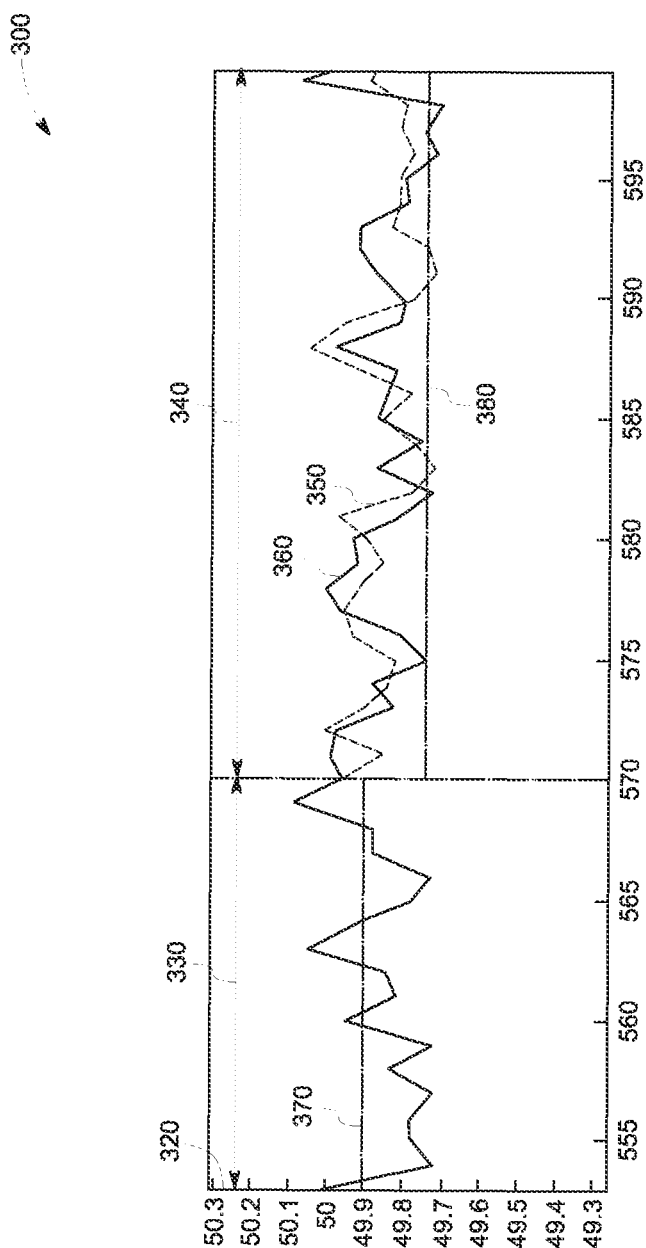
FIG. 3 is an exemplary graphical representation of a portion of the dispatch interval of FIG. 2 including a prediction time interval depicting a second grid frequency forecast in the prediction time interval computed using an auto regressive method in accordance with an embodiment of the invention.

FIG. 3 is an exemplary graphical representation of a portion 300 of the dispatch interval of FIG. 2 for one time instant depicting a second grid frequency forecast in the prediction time interval computed using an auto regressive method in accordance with an embodiment of the invention. X-axis 310 represents time in seconds. Y-axis 320 represents frequency in Hertz. The exemplary graphical representation depicts the portion 300 of the dispatch interval starting from five hundred and fifty seconds and ending at six hundred seconds. The portion 300 of the dispatch interval includes a section 330 of the observation time interval of FIG. 2 from five hundred and fifty seconds to five hundred and seventy seconds and a section 340 of the prediction time interval from five hundred and seventy seconds to six hundred seconds. Curve 350 represents grid frequency observed in the section 330 of the observation time interval prior to initiation prediction time interval. Curve 360 represents second grid frequency forecast in the prediction time interval. Curve 370 represents an average grid frequency in the observation time interval and curve 380 represents average of the second grid frequency forecast in the prediction time interval. The dispatch controller computes the second grid frequency forecast for the prediction time interval based on the auto regressive time series method using the equation:

$$F[T] = \sum_{i=1}^{N} \alpha_i F[T-i] \quad (1)$$

where F[T] refers to a discrete measurement of the grid frequency at time instant 'T' and 'α' are weightages determined from previous measurements.

The auto regressive time series can be used to relate a frequency measurement to previous measurements and forward predictions can be made utilizing estimated weightages and instantaneous measurements. The second grid frequency forecast represented by curve may be computed using equations (2) and (3) below:

$$F_{avg} = K_{obs} * F_{obsavg} + K_{prd} * F_{prdavg} \quad (2)$$

Where $$F_{prdavg} = \frac{1}{N_{prd}} \sum_{j=1}^{N_{prd}} F_{prd}(j)$$

where $F_{avg}$ is a predetermined internal average of the grid frequency for the dispatch interval, $K_{obs}$ is an observation time interval constant, $F_{obsavg}$ is an average of the grid frequency in the observation time interval, $K_{prd}$ is a prediction time interval constant, $F_{prdavg}$ is an average of the second grid frequency forecast, $N_{prd}$ is an order of autoregressive time series, $F_{prd}$ is a forecasted frequency for a time instant j. Similarly, the aforementioned process is repeated for each time instant in the dispatch interval of FIG. 2.

With continued reference to FIG. 2, upon computing the moving averages of the grid frequency and the farm power, the dispatch controller (FIG. 1) determines the farm power set point (FIG. 1) based on a predefined wind farm operating model using the farm power moving average and the grid frequency moving average. In one embodiment, the predefined wind farm operating model may include a predefined revenue model.

Figure 4:
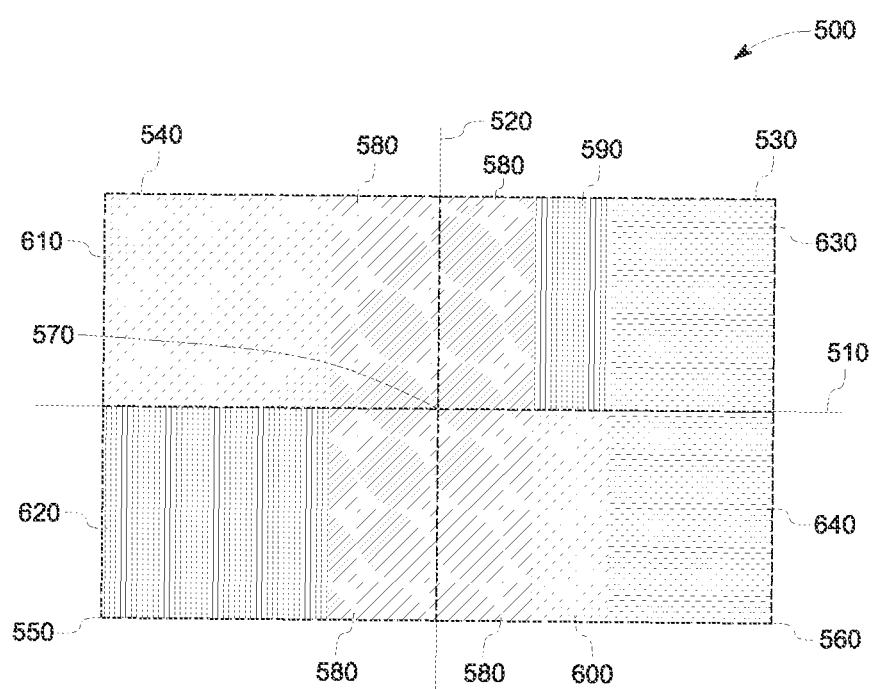
FIG. 4 is a graphical representation of an exemplary predefined wind farm operating model in accordance with an embodiment of the invention.

FIG. 4 is a graphical representation of an exemplary predefined wind farm operating model 500 in accordance with an embodiment of the invention. X-axis 510 represents a farm power deviation in the dispatch interval (FIG. 2). Y-axis 520 represents the grid frequency of the power grid in the dispatch interval.

A first quadrant 530 represents a situation where the farm power deviation is higher than a first farm power forecast computed by the forecasting processor (FIG. 1) and the grid frequency of the power grid is higher than a frequency fixed by a grid code in the power grid.

A second quadrant 540 represents a situation where the farm power deviation is lower than the first farm power forecast and the grid frequency of the power grid is higher than the frequency fixed by the grid code in the power grid.

A third quadrant 550 represents a situation where the farm power deviation is lower than the first farm power forecast and the grid frequency of the power grid is also lower than the frequency fixed by the grid code in the power grid.

A fourth quadrant 560 represents a situation where the farm power deviation is lower than the first farm power forecast and the grid frequency of the power grid is lower than the frequency fixed by the grid code in the power grid.

A no-deviation point represented by reference numeral 570 depicts a point where the farm power deviation is zero and an average farm power is equal to the first farm power forecast and the grid frequency of the power grid is equal to the frequency fixed by the grid code in the power grid.

Section 580 in quadrants 530, 540, 550, 560 depicts an acceptable deviation limit of an average farm power in the four quadrants. In one embodiment, the average farm power is determined from the farm power moving average. The acceptable deviation limits from the no-deviation point 570 may be thirty percent of the first farm power forecast.

Therefore, if the average farm power of the wind farm increases or decreases from the first farm power forecast for less than or equal to thirty percent, the revenues of the wind farm will not be impacted if the grid frequency of the power grid increases or decreases from the frequency fixed by the grid code.

Section 590 depicts a range of thirty percent to fifty percent deviation from the no-deviation point 570 of the average farm power of the wind farm in the dispatch interval in the first quadrant 530. If the average farm power of the wind farm increases between a range of thirty percent to fifty percent from the no-deviation point 570 and the grid frequency is higher than the fixed frequency, then the wind farm is penalized and the revenue of the wind farm decreases as the wind farm is undesirably contributing in increasing the grid frequency further. In contrast, as seen in the fourth quadrant 560, section 600 represents the average farm power of the wind farm which increases between a range of thirty percent to fifty percent from the no-deviation point 570 and the grid frequency which is lower than the fixed frequency, the wind farm gains an incentive in terms of revenue from a grid operator as the wind farm is contributing in increasing the grid frequency and reducing deviation of the grid frequency from the fixed frequency.

Similarly, in the second quadrant 540 if the average farm power of the wind farm decreases more than thirty percent from the no deviation point 570 and the grid frequency is higher than the fixed frequency as depicted by section 610, the wind farm gains a revenue based incentive from the grid operator as the wind farm is contributing in reducing the deviation in the grid frequency from the fixed frequency. In contrast, in the third quadrant 550 if the average farm power of the wind farm decreases more than thirty percent from the no deviation point 570 and the grid frequency is lower than the fixed frequency as depicted by section 620, the wind farm is penalized in terms of revenue from the grid operator as the wind farm is contributing in decreasing the grid frequency further and increasing the deviation in the grid frequency from the fixed frequency.

Moreover, if the average farm power of the wind farm exceed beyond fifty percent of deviation from the no-deviation point 570 as represented by sections 630 and 640 in the first quadrant 530 and the fourth quadrant 560 respectively, tariff for supplying power to power grid reduces by more than two to three times resulting in minimal revenues and loss to the wind farm. In one example, the tariff for supplying power within fifty percent deviation from the no-deviation point may be six rupees per kilowatt hour, however, the tariff beyond fifty percent from the no-deviation point reduces to about two rupees per kilowatt hour.

The dispatch controller also observes the grid frequency moving average in combination to the average farm power of the wind farm to identify one of the sections in the graphical representation of the wind farm operating model 500. Upon identifying the section in which the wind farm is operating, the dispatch controller determines the farm power set point to maximize the revenue of the wind farm. The revenue generated by the wind farm may be calculated based on the equation:

$$Rev = MIN(P_{MW}, frct*1.3)*PPA + MAX(P_{MW} - frct*1.5, 0)*PPACap + MIN(P_{MW} - 1.3*frct, 0.2*frct)*(UI(f) - RR)$$

where Rev is the total revenue generated for the wind farm in a dispatch interval, $P_{MW}$ is an average farm power in a dispatch interval, frct is the first farm power forecast for the dispatch interval, PPA is the power purchase price in INR/MWh, PPACap is the power purchase price cap for a hundred and fifty percent over-generation case, RR is the reference rate as per Availability Based Tariff (ABT) for the section of the graphical representation in which the wind farm operates, f is the moving average grid frequency including the second grid frequency forecast within a dispatch interval, UI is an unscheduled interchange penalty rate in INR/Mwh which is a function of the grid frequency.

$P_{MW}$ in the aforementioned equation, is a controllable state of the wind farm, where the average farm power can be controlled using wind turbine curtailment and energy storage elements. Details of the wind farm including energy storage element are described later in the specification. The farm power set point may vary continuously depending on the grid frequency and the power provided by the wind farm into the power grid. Therefore, the observation time interval helps to mitigate uncertainties associated with both the power of the wind farm and the grid frequency before initiating the control time interval.

Figure 5:
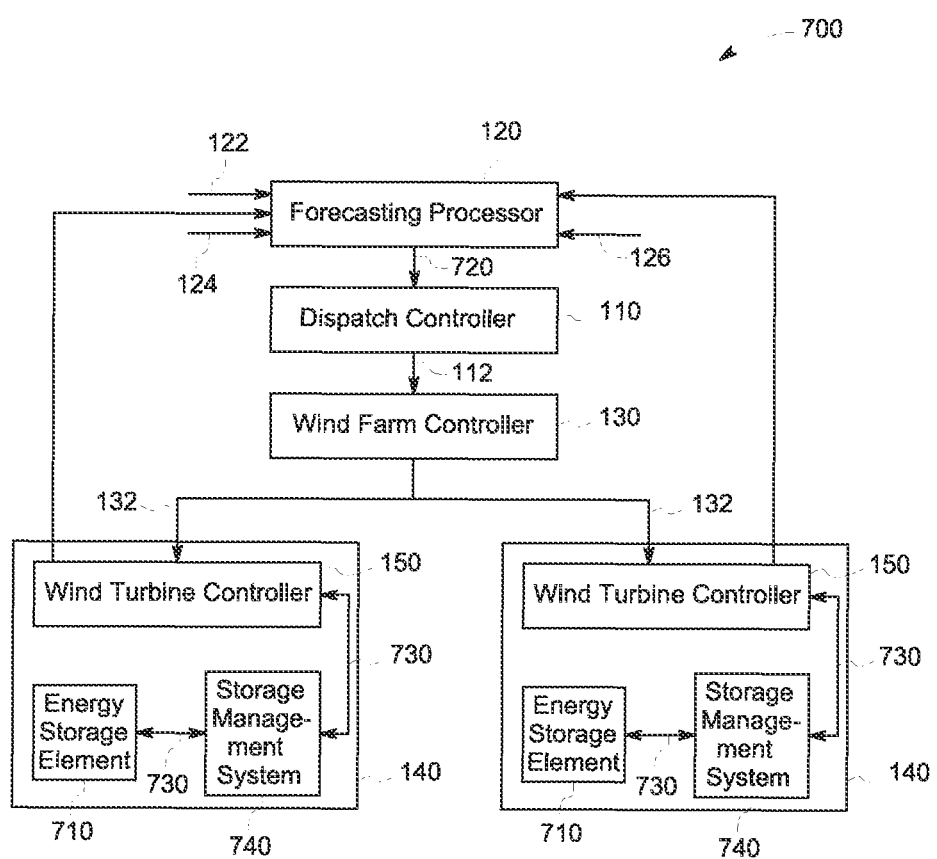
FIG. 5 is a block diagram representation of another embodiment of the wind farm of FIG. 1 in accordance with an embodiment of the invention.

With continued reference to FIG. 2, the dispatch controller (FIG. 1) computes the farm power set point (FIG. 1) using the farm power moving average, the grid frequency moving average 250, and the predefined wind farm operating model (FIG. 5). Upon computing the farm power set point, the dispatch controller transmits the farm power set point to the wind farm controller (FIG. 1) and simultaneously initiates the control time interval. The wind farm controller receives the farm power set point and controls one or more wind turbines in the wind farm during the control time interval 260 based on the farm power set point to regulate a farm-level dispatch power.

Referring back to FIG. 1, the wind farm controller 130 converts the farm power set point 112 to one or more turbine-level set points 132 and transmits the one or more turbine-level set points 132 to one or more wind turbines 140. As used herein, the term "turbine-level set point" may be defined as a set point generated by the wind farm controller based on the farm power set point for enabling the respective wind turbines 140 to generate and dispatch power based on the set point. The wind farm controller 130 analyzes the farm power set point 112 and identifies one or more wind turbines 140 required to meet the farm power set point 112. The wind farm controller 130 identifies the one or more wind turbines 140 based on individual status of each of the plurality of wind turbines 140 in the wind farm 100. Each of the wind turbines 140 include a wind turbine controller 150 that is communicatively coupled to the wind farm controller 130. The wind turbine controllers 150 of the one or more wind turbines 140 receive the turbine-level set points 132 from the wind farm controller 130 and control the one or more wind turbines 140 based on the turbine-level set points 132 to deliver a required power derived from the turbine-level set point 132 to regulate the farm-level dispatch power.

FIG. 5 is a block diagram representation of another embodiment 700 of the wind farm of FIG. 1 in accordance with an embodiment of the invention. In this embodiment, the wind farm 700 includes one or more energy storage elements 710 operatively coupled to the one or more wind turbines 140 in the wind farm 700. In one embodiment, the one or more energy storage elements 710 may include a farm-level energy storage element operatively coupled to the wind farm 700 or one or more turbine-level energy storage elements operatively coupled to the one or more wind turbines 140. The one or more energy storage elements 710 allow the wind farm 700 to more accurately regulate the farm-level dispatch power when compared to the wind farm 100 without the one or more energy storage elements. In one embodiment, the forecasting processor 120 further adjusts the first adjusted farm power forecast (FIG. 1) based on a droop characteristics of the one or more energy storage elements 710 to determine a second adjusted farm power forecast 720 that is submitted to the grid operator.

The forecasting processor 120 receives states of charge 730 of one or more energy storage elements 710 from the wind turbine controllers 150 which in turn receive the states of charge 730 from one or more storage management systems 740 communicatively coupled to the wind turbine controllers 150. The one or more storage management systems 740 may track the states of charge 730 of the respective energy storage elements 710. The forecasting processor 120 receives the states of charge 730 of the one or more energy storage elements 710 from the respective storage management systems 740 and computes an average state of charge of the one or more energy storage elements 710 represented on a farm-level droop characteristic curve of the one or more energy storage elements 710. In one embodiment, the droop characteristic curves of the one or more energy storage elements 710 may be determined based on a type of the energy storage element, a size of the wind farm, a rating of the energy storage element, a variability of the wind, or combinations thereof. The forecasting processor 120 further generates the second adjusted farm power forecast 720 based on the average state of charge of the one or more energy storage elements 710 in such a manner as to bring the states of charge 730 of the one or more energy storage elements 710 within a dead band limit of a desired state of charge.

Figure 6:
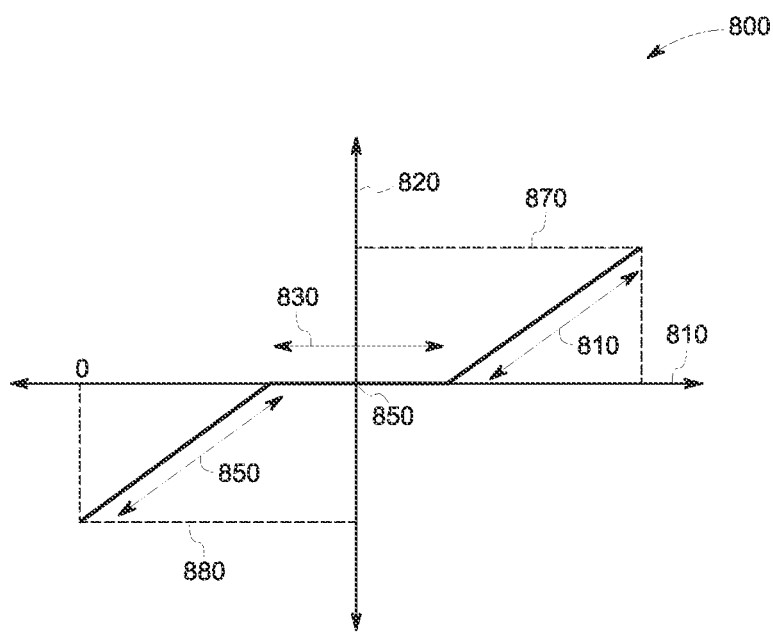
FIG. 6 is an exemplary graphical representation of an example droop characteristic curve representing an average state of charge of one or more energy storage elements in a wind farm in accordance with an embodiment of the invention.

Referring to FIG. 6, an exemplary graphical representation of an example droop characteristic curve 800 representing the average state of charge of the energy storage elements (FIG. 6) in the wind farm (FIG. 6) is shown in accordance with an embodiment of the invention. X-axis 810 represents the average state of charge of the one or more energy storage elements. Y-axis 820 represents a farm-level storage power of the one or more energy storage elements. Curve 830 represents a dead band limit of the average state of charge. The dead band limit may be defined as a threshold range of the average state of charge of the one or more energy storage elements. Slope 840 represents a positive power slope, and slope 850 represents a negative power slope. The positive power slope 840 represents a condition where the first adjusted farm power forecast is further adjusted such that the one or more energy storage elements may be discharged to provide farm-level storage power to a power grid (not shown). In contrast, the negative power slope 850 represents a condition where the first adjusted farm power forecast is further adjusted such that the one or more energy storage elements is capable of being charged by receiving excessive power from the power grid or the wind turbine (FIG. 6). The one or more energy storage elements may be charged or discharged to reach a target state of charge represented by arrow 860. The target state of charge 860 may be defined as a predefined position in the dead band limit at which the average state of charge of the one or more energy storage elements is desired to be maintained. In one embodiment, the target state of charge may be predetermined by a wind farm operator, and the one or more energy storage elements may be configured accordingly to operate based on the target state of charge. The average state of charge may represent a positive farm-level storage power 870 or a negative farm-level storage power 880 based on the position of the average state of charge in the positive farm-level power slope 840 or the negative farm-level power slope 850 respectively. The forecasting processor (FIG. 6) receives the states of charge (FIG. 6) of the one or more energy storage elements and generates the farm-level forecast adjustment. The farm-level forecast adjustment is added to the first adjusted farm power forecast to generate the second adjusted farm power forecast (FIG. 6). The second adjusted farm power forecast may either increase or decrease based on the positive farm-level forecast adjustment or the negative farm-level forecast adjustment respectively when compared to the first adjusted farm power forecast.

With continued reference to FIG. 5, the one or more energy storage elements 710 may be further employed during the dispatch interval (FIG. 2) to either provide additional power or absorb excessive power to maximize revenues based on the predefined wind farm operating model (FIG. 5). For example, in situations where one or more wind turbines 140 are unable to provide the farm power based on the farm power set point 112 during the dispatch interval, the one or more energy storage elements 710 may provide additional power to the wind farm 700 to meet the farm power required by the farm power set point 112. In contrast, the one or more energy storage elements 710 may store excess energy that may be generated by the wind farm 700 if the wind farm 700 is generating farm power more than thirty percent deviation from the no-deviation point (FIG. 5) and the grid frequency is also higher than the fixed frequency, which will result in reduction of the average frequency of the wind farm in the particular dispatch interval. Such reduction of the average frequency of the wind farm 700 will result in the wind farm operating in one or more sections (FIG. 5) that may provide incentives rather than penalty in terms of revenues.

Figure 7:
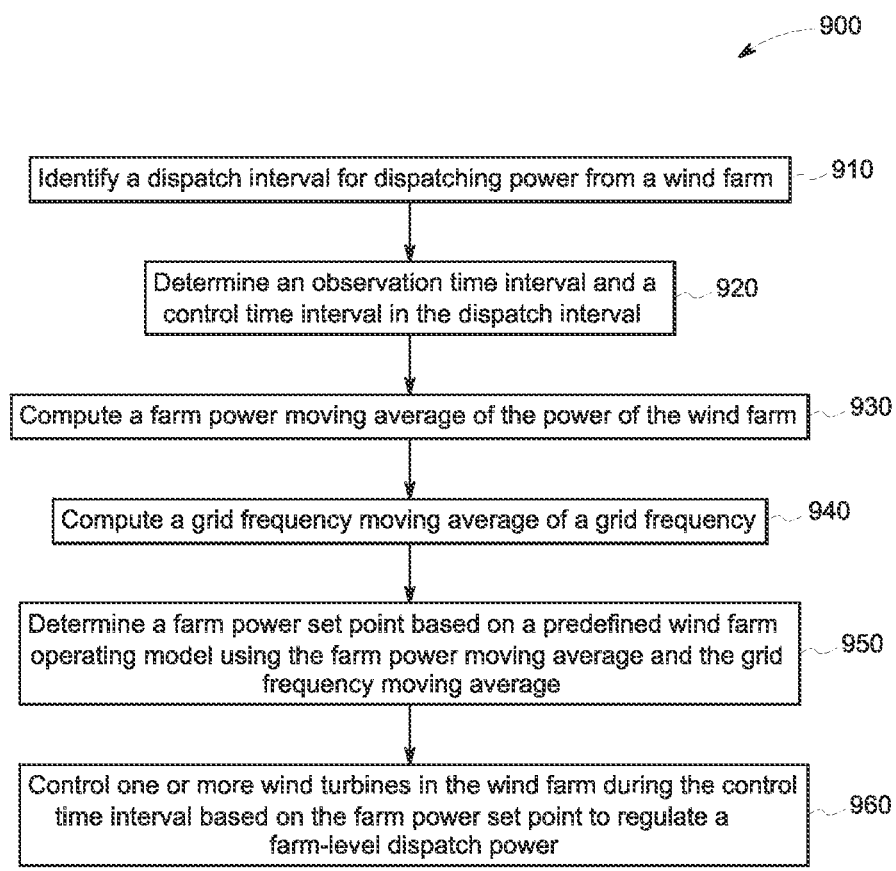
FIG. 7 is a flow chart representing steps involved in a method for regulating farm-level dispatch power in accordance with an embodiment of the invention.

FIG. 7 is a flow chart representing steps involved in a method 900 for regulating farm-level dispatch power in accordance with an embodiment of the invention. The method 900 includes identifying a dispatch interval for dispatching power from a wind farm in step 910. In one embodiment, the method 900 includes computing a first grid frequency forecast and a first farm power forecast prior to identifying the dispatch interval. In another embodiment, the first farm power forecast is adjusted based on the first grid frequency forecast to determine a first adjusted farm power forecast. In yet another embodiment, the first adjusted farm power forecast is adjusted based on a droop characteristics of an energy storage element to determine a second adjusted farm power forecast. In a specific embodiment, a fifteen minute time interval is identified as the dispatch interval. The method 900 further includes determining an observation time interval and a control time interval in the dispatch interval in step 920. In one embodiment, a prediction time interval is identified in the dispatch interval after determining the observation time interval. In another embodiment, a second farm power forecast of the power of the wind farm is computed for the prediction time interval. In yet another embodiment, a second grid frequency forecast is computed for the prediction time interval. In another embodiment, a forecast period of the first grid frequency and the first farm power forecast is higher than the prediction time interval. The method 900 also includes computing a farm power moving average of the power of the wind farm in the observation time interval in step 930 and computing a grid frequency moving average of a grid frequency in the observation time interval in step 940. The method 900 further includes determining a farm power set point based on a predefined wind farm operating model using the farm power moving average and the grid frequency moving average during the observation time interval in step 950. In one embodiment, a second farm power forecast and a second grid frequency forecast may be used for determining the farm power set point. In another embodiment, the farm power set point is determined based on a predefined revenue model. In yet another embodiment, the farm power set point is converted to one or more turbine-level set points and the one or more turbine-level set points are communicated to one or more wind turbine controller for controlling the one or more wind turbines. The method 900 further includes controlling one or more wind turbines in the wind farm during the control time interval based on the farm power set point to regulate a farm-level dispatch power in step 960.

Figure 8:
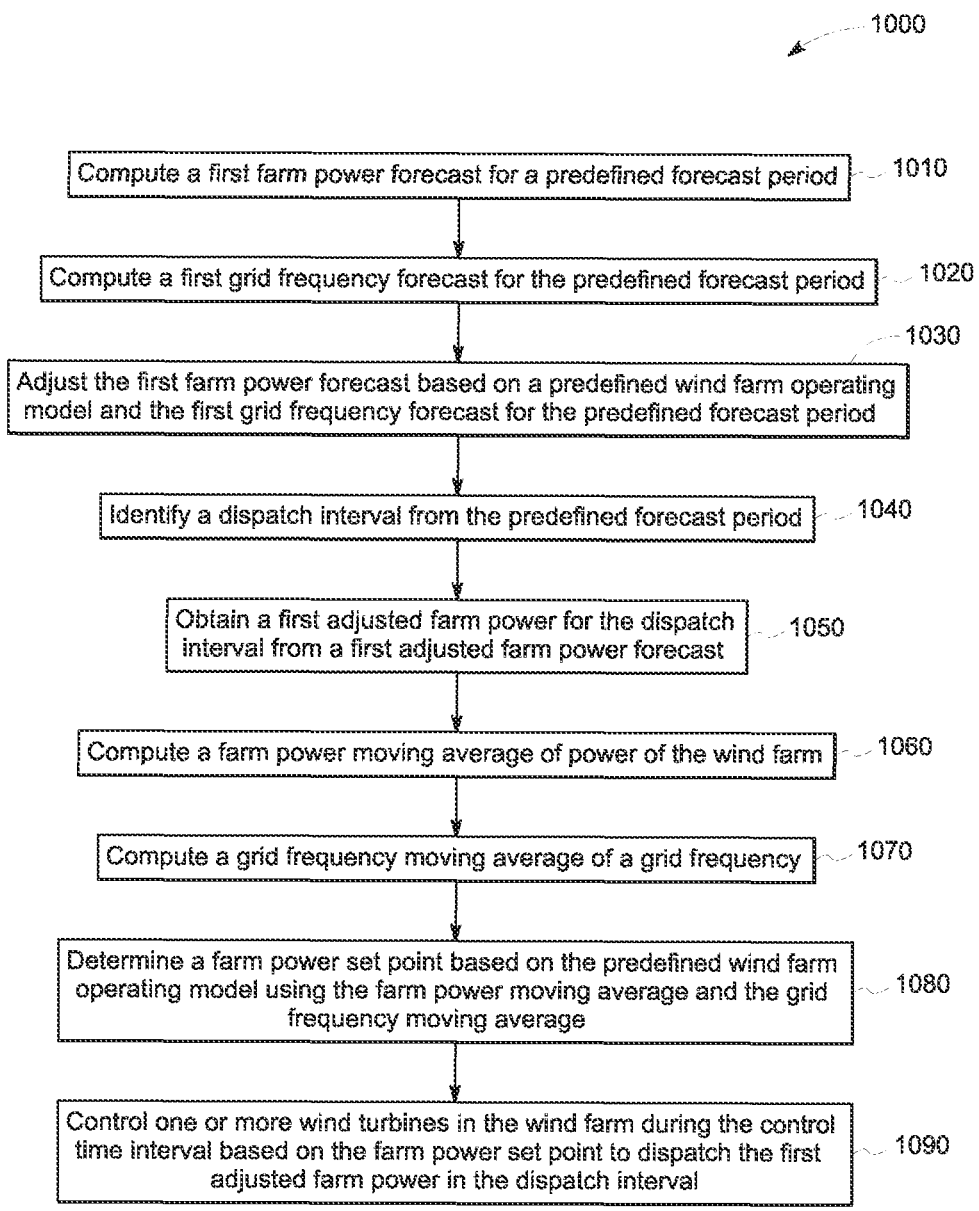
FIG. 8 is a flow chart representing steps involved in a method for scheduling and regulating farm-level dispatch power in accordance with an embodiment of the invention.

FIG. 8 is a flow chart representing steps involved in a method 1000 for scheduling and regulating farm-level dispatch power in accordance with an embodiment of the invention. The method 1000 includes computing a first farm power forecast for a predefined forecast period in step 1010. The method 1000 also includes computing a first grid frequency forecast for the predefined forecast period in step 1020. The first farm power forecast is adjusted based on a predefined wind farm operating model and the first grid frequency forecast for the predefined forecast period in step 1030. Furthermore, a dispatch interval is identified from the predefined forecast period in step 1040. Moreover, a first adjusted farm power for the dispatch interval is obtained from a first adjusted farm power forecast in step 1050. The method 1000 also includes computing a farm power moving average of power of the wind farm in step 1060. Furthermore, a grid frequency moving average of a grid frequency is computed in step 1070. In step 1080, a farm power set point based on the predefined wind farm operating model using the farm power moving average and the grid frequency moving average is determined. Moreover, one or more wind turbines in the wind farm are controlled during the control time interval based on the farm power set point to dispatch the first adjusted farm power in the dispatch interval in step 1090.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   identifying a dispatch interval for dispatching power of a wind farm;
   determining an observation time interval and a control time interval within the dispatch interval;
   computing a farm power moving average of the power of the wind farm;
   computing a grid frequency moving average of a grid frequency;
   determining a farm power set point based on a predefined wind farm operating model using the farm power moving average and the grid frequency moving average; and
   controlling one or more wind turbines in the wind farm during the control time interval based on the farm power set point to regulate a farm-level dispatch power.

2. The method of claim 1, further comprising computing a first grid frequency forecast and a first farm power forecast prior to identifying the dispatch interval.

3. The method of claim 2, further comprising adjusting the first farm power forecast based on the first grid frequency forecast to determine a first adjusted farm power forecast.

4. The method of claim 3, further comprising adjusting the first adjusted farm power forecast based on a droop characteristic of an energy storage element to determine a second adjusted farm power forecast.

5. The method of claim 1, further comprising identifying a prediction time interval in the dispatch interval after determining the observation time interval.

6. The method of claim 5, further comprising computing a second farm power forecast of the power of the wind farm for the prediction time interval.

7. The method of claim 5, further comprising computing a second grid frequency forecast of the grid frequency for the prediction time interval.

8. The method of claim 5, wherein a forecast period of a first grid frequency forecast and a first farm power forecast is higher than the prediction time interval.

9. The method of claim 1, further comprising using a second farm power forecast and a second grid frequency forecast for determining the farm power set point.

10. The method of claim 1, wherein determining the farm power set point based on the predefined wind farm operating model comprises determining the farm power set point based on a predefined revenue model.

11. The method of claim 1, further comprising converting the farm power set point to one or more turbine-level set points and communicating the one or more turbine-level set points to one or more wind turbine controller for controlling the one or more wind turbines.

12. A wind farm comprising:
   a plurality of wind turbines operatively coupled to each other, wherein each wind turbine comprises a wind turbine controller;
   a wind farm controller communicatively coupled to the wind turbine controller of each wind turbine;
   a dispatch controller operatively coupled to the wind farm controller, wherein the dispatch controller is configured to:
     identify a dispatch interval for dispatching power from the wind farm;
     determine an observation time interval and a control time interval in the dispatch interval;
     compute a farm power moving average of the power of the wind farm;
     compute a grid frequency moving average of a grid frequency;
     determine a farm power set point based on a predefined wind farm operating model using the farm power moving average and the grid frequency moving average; and
     communicate the farm power set point to the wind farm controller;
   wherein the wind farm controller is configured to receive and convert the farm power set point to one or more turbine-level set points and communicate the one or more turbine-level set points to one or more wind turbine controllers; and wherein the one or more wind turbine controllers control respective wind turbines in the wind farm during the control time interval based on the one or more turbine-level set points to regulate a farm-level dispatch power.

13. The wind farm of claim 12, further comprises one or more energy storage elements operatively coupled to one or more wind turbines in the wind farm.

14. The wind farm of claim 13, wherein the one or more energy storage elements comprise a farm-level energy storage element operatively coupled to the wind farm or a turbine-level energy storage element operatively coupled to the one or more wind turbines.

15. The wind farm of claim 12, wherein the dispatch controller is integrated within the wind farm controller or the dispatch controller is coupled externally to the wind farm controller.

16. The wind farm of claim 12, wherein the predefined wind farm operating model comprises a predefined revenue model.

17. The wind farm of claim 12, further comprising a forecasting processor configured to compute a first grid frequency forecast and a first farm power forecast prior to identifying the dispatch interval.

18. The wind farm of claim 17, wherein the forecasting processor adjusts the first farm power forecast based on the first grid frequency forecast to determine a first adjusted farm power forecast.

19. The wind farm of claim 12, wherein the dispatch controller determines a second farm power forecast and a second grid frequency forecast and uses the second farm power forecast and the second grid frequency forecast to determine the farm power set point.

20. A method comprising:
computing a first farm power forecast for a predefined forecast period;
computing a first grid frequency forecast for the predefined forecast period;
adjusting the first farm power forecast based on a predefined wind farm operating model and the first grid frequency forecast for the predefined forecast period;
identifying a dispatch interval from the predefined forecast period;
obtaining a first adjusted farm power for the dispatch interval from a first adjusted farm power forecast;
computing a farm power moving average of power of a wind farm;
computing a grid frequency moving average of a grid frequency;
determining a farm power set point based on the predefined wind farm operating model using the farm power moving average and the grid frequency moving average; and
controlling one or more wind turbines in the wind farm during a control time interval based on the farm power set point to dispatch the first adjusted farm power in the dispatch interval.

* * * * *